UNITED STATES PATENT OFFICE.

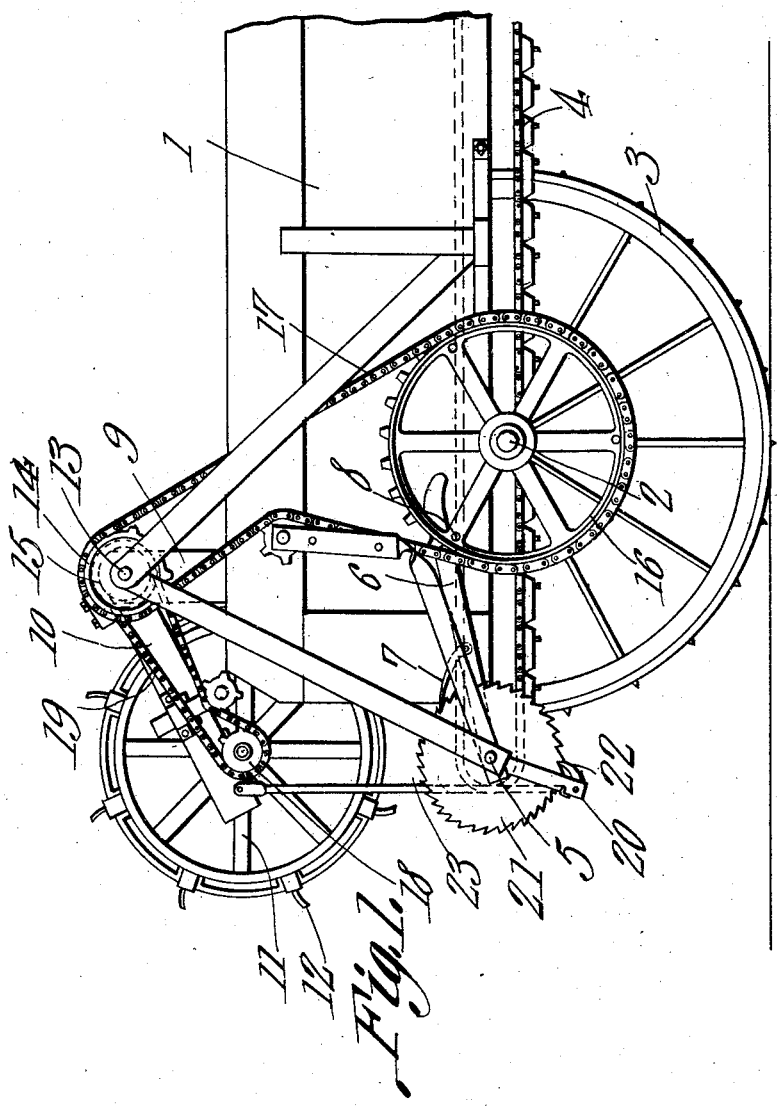

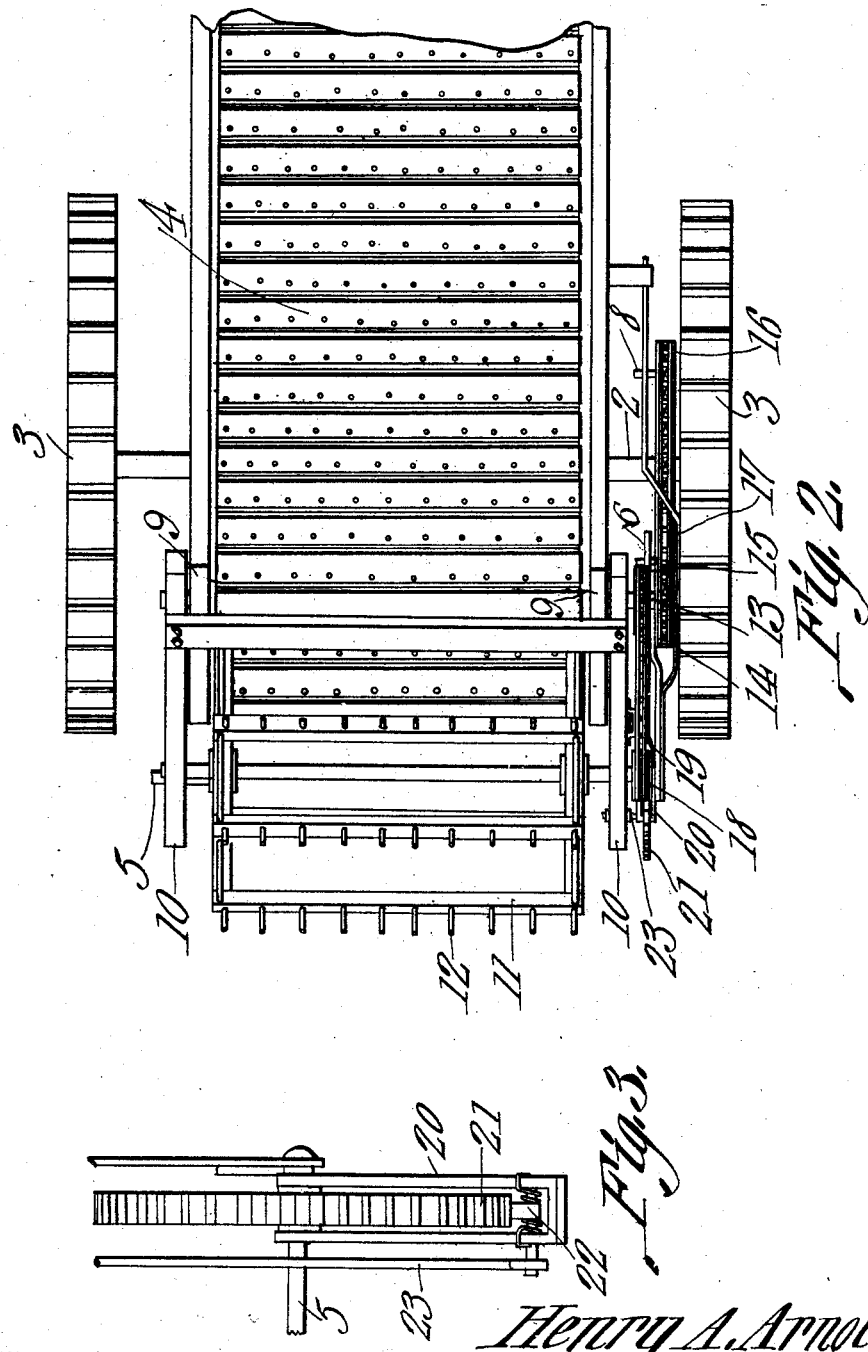

HENRY A. ARNOLD, OF LAKE GENEVA, WISCONSIN.

MANURE-SPREADER.

973,742.  Specification of Letters Patent.  Patented Oct. 25, 1910.

Application filed July 29, 1910. Serial No. 574,529.

*To all whom it may concern:*

Be it known that I, HENRY A. ARNOLD, a citizen of the United States, residing at Lake Geneva, in the county of Walworth and State of Wisconsin, have invented a new and useful Manure-Spreader, of which the following is a specification.

This invention relates to an undercast manure spreader and consists in the novel construction and arrangement of its parts as hereinafter shown, described and claimed.

The object of the invention is to provide a spreader of the character indicated which is steady in its operation and moves and casts the material in a uniform manner. It not infrequently happens in the winter time that the material contains frozen lumps. Also it frequently happens that when the material includes frozen lumps that it also contains much soft matter and it is the prime object of the present invention to provide a machine adapted to handle the material in a uniform manner.

In the accompanying drawings—Figure 1 is a side elevation of the rear portion of the manure spreader. Fig. 2 is a top plan view of the same. Fig. 3 is a detailed view of a portion of the same.

The manure spreader includes a body 1 of usual pattern which is mounted upon an axle 2 which in turn is supported upon traction wheels 3. The axle 2 is arranged to rotate in unison with the traction wheels 3 in the usual manner. An endless conveyer 4 of the usual pattern is arranged to move along the bottom of the body 1. The conveyer 4 is arranged to move about a shaft 5 which is journaled for rotation at the end of the body 1 and is rotated by means hereinafter to be explained. Standards 9 are located at the sides of the body 1 and the upper ends of arms 10 are pivoted to the said standards so that the said arms may swing in vertical plane. A reel 11 is journaled between the lower ends of the said arms and is provided upon its periphery with suitable teeth or pins 12. A shaft 13 forms the pivot for one of the arms 10 and sprocket wheels 14 and 15 are mounted upon the said shaft 13. A sprocket wheel 16 is mounted upon the axle 2 and a sprocket chain 17 passes around the sprocket wheels 14 and 15 and is adapted to transmit rotary movement from the axle 2 to the shaft 13. A sprocket wheel 18 is fixed to the shaft of the reel 11 and a sprocket chain 19 passes around the sprocket wheels 14 and 18 and is adapted to transmit rotary movement from the shaft 13 to the reel 11. A yoke 20 is pivoted upon the end portion of the shaft 5 and a ratchet disk 21 is fixed to the said shaft 5 and is located within the yoke 20. The yoke 20 carries a spring pressed pawl 22 which is adapted to engage the teeth of the disk 21. A rod 23 is pivotally connected at its upper end with the rear end portion of one of the arms 10 and at its lower end the said rod 23 is pivotally connected with the lower or free end portion of the yoke 20.

A lever 6 is fulcrumed upon the shaft 5 and carries a pivoted pawl 67 which engages the ratchets of the disk 21. Tappets 8 are located upon the spokes of the wheel 16 and are spaced at suitable intervals apart. The upper free end of the lever 6 lies in the path of movement of the tappets 8 and as the said lever is encountered necessarily by the said tappets the lever is swung and through the pawl 7 the disk 21 and shaft 5 are partially rotated.

From the above description it will be seen that as the body 1 moves in a forward direction the upper run of the conveyer 4 will be moved toward the rear end of the said body 1. Thus the material within the body is moved toward the rear end thereof. At the same time when the pins 12 carried by the reel 11 engage the material the said material is cast in a downward direction from the end of the body 1. If at any time the pins carried by the reel 11 should encounter a hard lump of material the said reel will climb over the same and at the same time the rear ends of the arms 10 will be swung in an upward direction. The upward movement on the part of one of the arms 10 will move the rod 23 longitudinally in a vertical direction and the yoke 20 will be swung upon its pivot which will carry the spring pressed pawl around and in contact with some of the uppermost teeth of the ratchet disk 21. The disk 21 continues to rotate with the shaft 5 and consequently when the lump of material which has lifted the reel 11 is ejected from the body the said reel 11 is supported in an elevated position and can descend in a gradual manner only and this is done as the disk 21 rotates. Therefore the reel 11 and its attachments is prevented from descending rapidly which would result in the uneven distribution of the material and more or less damage to the parts of the spreader.

Having described the invention what I claim as new and desire to secure by Letters Patent is:

1. In combination with a body having an apron mounted for movement along its bottom, and a reel journaled for rotation and arranged to move vertically with relation to the apron, and means connected with the reel and adapted to move freely when the reel moves in an upward direction and which operatively engages the apron mechanism to retard the descent of the reel.

2. In combination with a body having an apron mounted for movement along its bottom, a reel journaled for rotation and arranged to swing vertically with relation to the body, means connected with the reel and adapted to move freely with the reel when the reel moves in an upward direction, and which operatively engages the apron mechanism to retard the descent of the reel but permitting the downward movement of the reel at a rate in proportion to the rate of movement of the apron.

3. In combination with a body having an apron arranged to move along its bottom, a ratchet disk forming a part of the apron mechanism and arranged to rotate as the apron moves, arms pivotally mounted upon the body, a reel journaled for rotation between the arms, means for rotating the reel, a rod connected to one of the arms, a yoke pivotally supported and straddling the ratchet disk, said rod being pivotally connected to the outer portion of the yoke and a spring pressed pawl carried by the yoke and adapted to engage the teeth of the ratchet disk.

In testimony that I claim the foregoing as my own, I have hereto affixed my signature in the presence of two witnesses.

HENRY A. ARNOLD.

Witnesses:
FRANKLIN J. TYRRELL,
ROSALIE HUME.